(12) United States Patent
Bruce et al.

(10) Patent No.: US 11,853,698 B2
(45) Date of Patent: *Dec. 26, 2023

(54) NATURAL LANGUAGE TEXT PROCESSING FOR AUTOMATED PRODUCT GAP CLUSTERING AND DISPLAY

(71) Applicant: Vivun Inc., Oakland, CA (US)

(72) Inventors: John Robert Bruce, Carson City, NV (US); Matthew James Darrow, Oakland, CA (US); Joseph Patrick Miller, New Hope, PA (US); John Joseph Salvatore, Punta Gorda, FL (US); Rayne Krystopher Hernandez, San Francisco, CA (US); Alexander Matthew Metelitsa, Brooklyn, NY (US)

(73) Assignee: Vivun Inc., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/742,765

(22) Filed: May 12, 2022

(65) Prior Publication Data

US 2023/0143577 A1 May 11, 2023

Related U.S. Application Data

(63) Continuation of application No. 17/524,215, filed on Nov. 11, 2021, now Pat. No. 11,354,505.

(51) Int. Cl.
*G06F 40/00* (2020.01)
*G06F 40/284* (2020.01)
(Continued)

(52) U.S. Cl.
CPC ............. *G06F 40/284* (2020.01); *G06F 3/14* (2013.01); *G06F 16/3329* (2019.01)

(58) Field of Classification Search
CPC ......... G06F 40/20; G06F 40/279; G06F 40/23
See application file for complete search history.

(56) References Cited

U.S. PATENT DOCUMENTS

| 6,691,309 B1* | 2/2004 | Lorie | G06F 16/113 |
| | | | 714/E11.122 |
| 11,416,700 B1* | 8/2022 | Bhatt | G06F 18/22 |

(Continued)

*Primary Examiner* — Daniel Abebe
(74) *Attorney, Agent, or Firm* — Baker Botts L.L.P.

(57) ABSTRACT

An example computer-implemented method embodying the disclosed technology comprises digitally storing a plurality of digital objects comprising first type digital objects and second type digital objects, each digital object comprising an electronic digital representation of natural language text, and certain first type digital objects each being associated with exactly one second type digital object; programmatically generating a corpus of digital documents from the plurality of digital objects; programmatically embedding the electronic digital representation of natural language text of each first type digital object not associated with one of the second type digital objects, thereby generating a second set of vectors; programmatically determining, for each of the second set of vectors, a corresponding set of nearest neighbor vectors from the first set of vectors; programmatically generating recommendation data indicating potential new associations between first type digital objects and second type digital objects; and displaying a representation of the recommendation data.

18 Claims, 6 Drawing Sheets

(51) Int. Cl.
    *G06F 16/332*    (2019.01)
    *G06F 3/14*    (2006.01)

(56) References Cited

U.S. PATENT DOCUMENTS

| | | | |
|---|---|---|---|
| 11,625,535 B1* | 4/2023 | Hore | ............... G06F 18/213 |
| | | | 704/9 |
| 2018/0157662 A1 | 6/2018 | Chin et al. | |
| 2021/0089822 A1* | 3/2021 | Baek | ............... G06F 16/9577 |
| 2021/0142356 A1 | 5/2021 | Samanta et al. | |
| 2021/0209305 A1 | 7/2021 | Machado et al. | |
| 2021/0216288 A1 | 7/2021 | Bahrami et al. | |
| 2022/0035990 A1 | 2/2022 | Kaza et al. | |

\* cited by examiner

NATURAL LANGUAGE TEXT PROCESSING FOR AUTOMATED PRODUCT GAP CLUSTERING AND DISPLAY

BENEFIT CLAIM

This application claims the benefit under 35 U.S.C. § 120 as a continuation of application Ser. No. 17/524,215, filed Nov. 11, 2021, the entire contents of which are hereby incorporated by reference for all purposes as if fully set forth herein. Applicant hereby rescinds any disclaimer of claim scope in the application(s) of which the benefit is claimed and advises the USPTO that the present claims may be broader than any application(s) of which the benefit is claimed.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2021 Vivun Inc.

TECHNICAL FIELD

One technical field of the present disclosure is computer-implemented artificial intelligence, in the subfield of natural language processing, using models that are programmed to detect existing digital data relationships and form new digital data relationships between digital objects representing natural language text. Another technical field is machine learning model development, training, deployment, and operationalization.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

"PreSales" is a term for sales processes and transactions that occur before a service, product, or asset is released to a general market, typically in the context of business-to-business sales rather than for consumer products, and often in the high-tech field. PreSales teams may comprise Sales/Solutions Engineers (SEs), Solution Consultants (SCs), or other team members who support sales teams in qualifying or progressing new and existing customers through a funnel to deal closing. PreSales practitioners may be responsible for, among other things, technical demonstrations, requests for proposal (RFPs), proof of concepts (POCs), discovery, introductory demonstrations, product knowledge improvement, planning or architecture solutions, consulting calls, customer support, or Frequently Asked Questions (FAQs).

PreSales acts as the technical conscience of every deal in the forecast. Sales Engineers keep their Sales counterparts honest by highlighting why a deal may be at risk from a technical perspective and offering prescriptive advice on how to secure the technical win. But even the best team members can be misled by gut feeling or lack the ability to properly articulate why they feel a particular opportunity is at risk. In certain circumstances, a deal may be at risk because of an Opportunity Gap. An Opportunity Gap, in the context of a particular deal, is a missing feature of an existing product or service, offered to a prospect, that a prospect may want or need in order to conclude that deal. Similarly, one or more deals with a prospect may be at risk because of an Account Gap. An Account Gap is a missing feature of a product or service tied to an account as a whole that may jeopardize the conclusion of one or more deals with the prospect. Moreover, a Product Gap exists when a sales team cannot provide a product or service that meets a specific need across a range of prospects, potentially jeopardizing a variety of deals across a variety of accounts.

As a part of a standard workflow, a PreSales practitioner may generate natural language text that may suggest an Opportunity Gap or an Account Gap. Indeed, as technical liaisons embedded in the field, PreSales practitioners are constantly evaluating product-buyer fit and uncovering new customer use cases. It would be beneficial if these insights were immediate and actionable, so that they could directly shape a product roadmap to drive growth.

However, feature requests often are driven by the largest deal in the forecast, the loudest set of voices in the room, or worst—unacknowledged due to a lack of data. Even in organizations where collaboration between PreSales practitioners and Product practitioners occurs to capture customer feedback, the process is often manually intensive and noisy. Sorting through a mountain of tickets filled with duplicate requests from disparate systems to find what is truly important may result in missed opportunities and a lack of alignment between PreSales teams and Product teams about what matters most on the product roadmap. The relevant technical issues include a lack of sufficient computer-based methods to make actionable inferences between individual accounts, as well as the inability of humans to objectively determine the similarity of various Opportunity Gaps and Account Gaps logged in computer memory and the appropriateness of generating a corresponding new Product Gap. Additional relevant technical issues include the inability of humans to form high-quality and unbiased recommendations for associating an existing Opportunity Gap or Account Gap logged in computer memory with an existing Product Gap logged in computer memory based upon a large universe of data that is structured in multiple ways.

If a technical solution could be developed to effectively address the aforementioned issues, then it would represent a significant advance in the state of the art.

DETAILED DESCRIPTION

Figure 1:
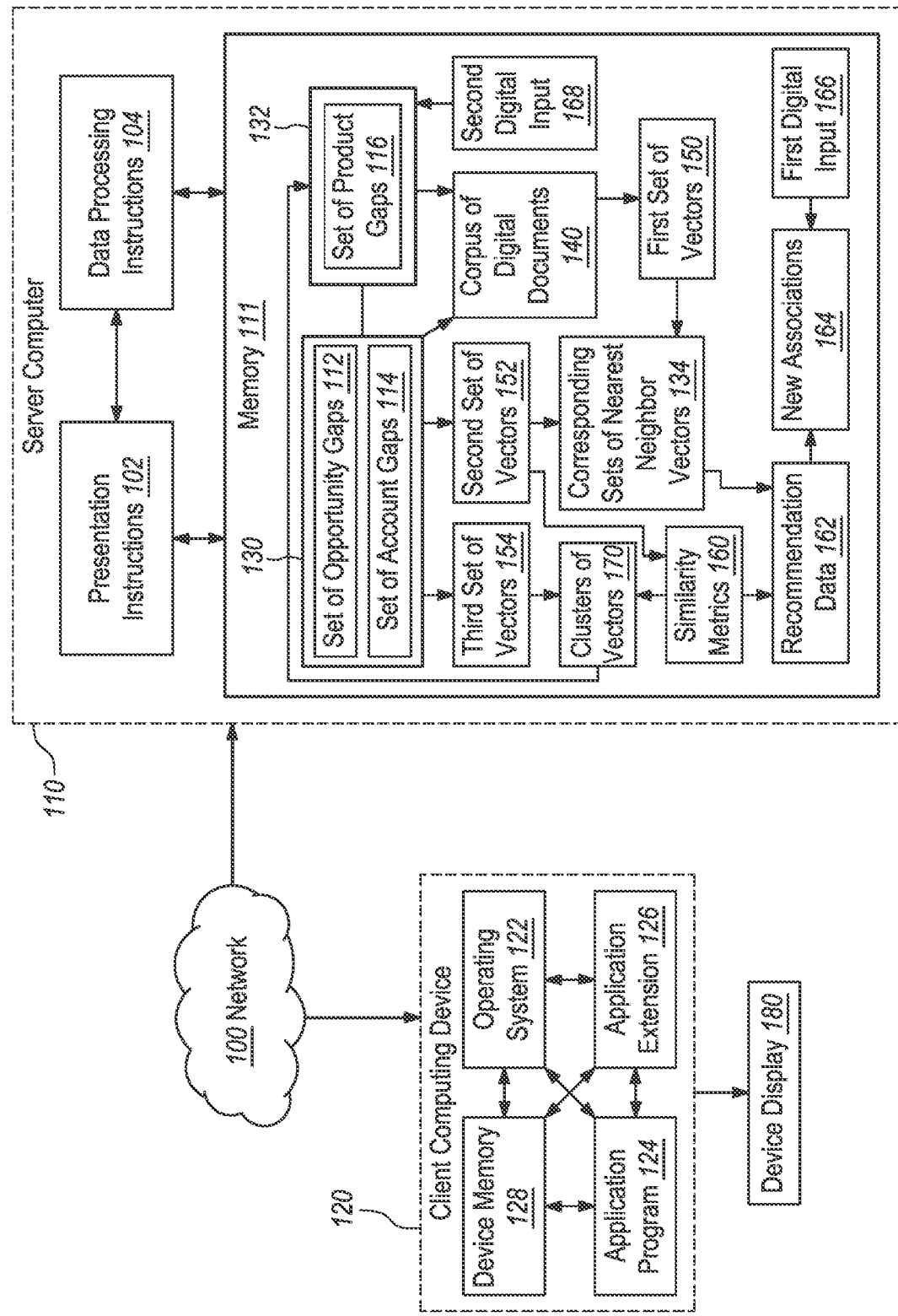
FIG. 1 illustrates a distributed computer system showing the context of use and principal functional elements with which one embodiment could be implemented.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1.0 General Overview
2.0 Structural & Functional Overview
3.0 Example Automated Digital Data Relationship Formation Process and Output
4.0 Example Automated Product Gap Clustering Process and Output
5.0 Implementation Example—Hardware Overview

1.0 General Overview

In one embodiment, the disclosure provides techniques for detecting existing digital data relationships and forming new digital data relationships between digital objects representing natural language text. A first example programmed process embodies a suggestions feature and comprises programmatically associating an Opportunity Gap or Account Gap with an existing Product Gap. A second example programmed process embodies a clustering feature and comprises programmatically creating a new Product Gap. All references in this disclosure to an Opportunity Gap, Account Gap, or Product Gap refer to digital objects that are programmatically created and stored in computer memory and/or persistent digital storage. In an embodiment, the disclosure provides a programmed online distributed computer system or platform implemented via client-server Software as a Service (SaaS) techniques that executes, among other processes, the aforementioned first and second example programmed processes.

In one embodiment, platform users may manually create Account Gaps or Opportunity Gaps in the context of a single prospect or a single deal, respectively, either of which may contain cross-prospect themes of interest to a product manager. All references to "users," in this disclosure, refer to manipulation of human-computer interfaces to provide data to a computer system, and/or programmatic action by user accounts or user computers interoperating with a system, and not to human action in the abstract. Some Account Gaps or Opportunity Gaps may be the result of core aspects of a product itself, and may impact many different customers, rather than the single prospect or the single deal against which the Account Gaps or Opportunity Gap was logged. In one embodiment, the platform provides a programmed automated method of organizing what the cross-customer Product Gaps are, and which Account Gaps or Opportunity Gaps relate to them. In one embodiment, the platform employs programmed techniques leveraging novel natural language processing (NLP) techniques to curate digital objects representing Account Gaps, Opportunity Gaps, and Product Gaps over time so that a platform user (like an organization) can understand high level themes present in the data and make effective prioritization decisions.

Product Gaps may be represented as a digital object intended to capture these common themes and serve as a shared container object to index related Account Gaps or Opportunity Gaps. A Product Gap may also provide a place for a product manager to author a distilled description of a common thread that connects all of the gaps linked to that Product Gap, in product-centric terms.

Newly created Account Gaps or Opportunity Gaps logged by a sales engineer on the platform may or may not be related to an existing Product Gap. In one embodiment, the disclosure provides a programmed automated method of making accurate associations between these digital objects over time. The ability to make such accurate, bias-free association is an important technical advantage of an embodiment; that ability allows customer demand for features to be quantified, facilitating the systematic prioritization of product backlog as information changes or new data becomes available.

Whereas a traditional manual association process would require cumbersome manual search and linking of Account Gaps or Opportunity Gaps to Product Gaps, instead the disclosure provides an automated system comprising functionality that would be impracticable or impossible in a manual setting. For instance, there may be many Product Gaps candidates, and choosing the one that is perceived as correct, or deciding that a new one needs to be created, might involve searching a large body of information. This could be very time consuming and error prone if attempted manually, especially for an organization with many existing gaps. Moreover, the disclosure provides novel automated methods for suggestions and clustering which operate using concrete, objective measures of relatedness of data inputs to programmatically generate consistent, unbiased, and readily usable outputs, which would be truly impossible with a traditional manual system.

In one embodiment, the disclosure provides a computer-implemented or programmed method, comprising: digitally storing a plurality of digital objects comprising first type digital objects and second type digital objects, each digital object comprising an electronic digital representation of natural language text; executing first programmed instructions to generate a corpus of digital documents, each digital document of the corpus comprising: the electronic digital representation of natural language text of each particular second type digital object of the plurality of digital objects; and the electronic digital representation of natural language text of each first type digital object associated with that particular second type digital object; executing second programmed instructions to vectorize each digital document of the corpus to generate a first set of vectors; executing third programmed instructions to embed the electronic digital representation of natural language text of each first type digital object not associated with one of the second type digital objects in a vector space of the first set of vectors, thereby generating a second set of vectors, each vector of the second set of vectors being associated with the first type digital object comprising the electronic digital representation of natural language text from which it was embedded; executing fourth programmed instructions to determine, for each vector of the second set of vectors, a corresponding set of nearest neighbor vectors selected from the first set of vectors; executing fifth programmed instructions to generate, at least partly based on the determined sets of nearest neighbor vectors, recommendation data indicating one or more potential new associations between first type digital objects and second type digital objects; and displaying, in a graphical user interface on a device display, a representation of the recommendation data.

One embodiment comprises the fifth programmed instructions being programmed to generate the recommendation data by: generating, for each vector of the second set of vectors, a similarity metric between that vector and each vector of the corresponding set of nearest neighbor vectors; and comparing the generated similarity metrics to a threshold similarity metric stored in computer memory. In one embodiment, the similarity metric is a Cosine Similarity metric.

One embodiment comprises executing sixth instructions that are programmed to cause: generating a third set of vectors from the specific vectors of the second set of vectors that did not generate any similarity metrics above the threshold similarity metric by embedding each first type digital object associated with those specific vectors in a new vector space; clustering a plurality of vectors of the third set of vectors, thereby generating one or more clusters of vectors; generating, for each cluster of vectors, a corresponding new second type digital object; and associating, for each cluster of vectors, for each particular first type digital object from which a vector in that cluster of vectors was generated, that particular first type digital object with the corresponding new second type digital object.

One embodiment comprises the sixth instructions being programmed to implement a Gridsearch algorithm to find K optimal clusters by Silhouette Score and being further programmed to implement a K-Means algorithm to perform the clustering.

One embodiment comprises prior to associating at least one of the first type digital objects with the corresponding new second type digital object, receiving a digital input indicating approval of a new digital data relationship represented by the associating.

One embodiment comprises the first type being a feature type, the feature type comprising an opportunity gap type and an account gap type, and the second type being a product gap type.

One embodiment comprises each electronic digital representation of natural language text representing a name and a description.

One embodiment comprises the second programmed instructions being programmed to implement a TF-IDF algorithm.

One embodiment comprises executing seventh programmed instructions formatted to cause tokenizing and sanitizing each digital document of the corpus.

One embodiment comprises: receiving a digital input indicating approval of one of the one or more potential new associations between first type digital objects and second type digital objects indicated by the recommendation data; programmatically associating a corresponding first type digital object with a corresponding second type digital object, thereby forming a digital data relationship that did not previously exist; and displaying, in the graphical user interface on the device display, a representation of the digital data relationship that did not previously exist.

One embodiment comprises displaying, in the graphical user interface on the device display, prior to receiving the digital input indicating approval of the new digital data relationship represented by the associating, a representation of the new digital data relationship represented by the associating with a confidence score indicating a programmatically calculated strength of association.

One embodiment comprises: programmatically determining a set of natural language keywords for at least one cluster; and displaying, in the graphical user interface on the device display, the set of natural language keywords with a representation of the new digital data relationship represented by the associating.

In one embodiment, the disclosure provides one or more computer-readable non-transitory storage media storing instructions operable when executed by one or more processors to cause performance of: digitally storing a plurality of digital objects comprising first type digital objects and second type digital objects, each digital object comprising an electronic digital representation of natural language text; executing first programmed instructions to generate a corpus of digital documents, each digital document of the corpus comprising: the electronic digital representation of natural language text of each particular second type digital object of the plurality of digital objects; and the electronic digital representation of natural language text of each first type digital object associated with that particular second type digital object; executing second programmed instructions to vectorize each digital document of the corpus to generate a first set of vectors; executing third programmed instructions to embed the electronic digital representation of natural language text of each first type digital object not associated with one of the second type digital objects in a vector space of the first set of vectors, thereby generating a second set of vectors, each vector of the second set of vectors being associated with the first type digital object comprising the electronic digital representation of natural language text from which it was embedded; executing fourth programmed instructions to determine, for each vector of the second set of vectors, a corresponding set of nearest neighbor vectors selected from the first set of vectors; executing fifth programmed instructions to generate recommendation data indicating one or more potential new associations between first type digital objects and second type digital objects by: generating, for each vector of the second set of vectors, a similarity metric between that vector and each vector of the corresponding set of nearest neighbor vectors; and comparing the generated similarity metrics to a threshold similarity metric stored in computer memory; programmatically generating a third set of vectors from the specific vectors of the second set of vectors that did not generate any similarity metrics above the threshold similarity metric by embedding each first type digital object associated with those specific vectors in a new vector space; programmatically clustering a plurality of vectors of the third set of vectors, thereby generating one or more clusters of vectors; programmatically generating, for each cluster of vectors, a corresponding new second type digital object; and programmatically associating, for each cluster of vectors, for each particular first type digital object from which a vector in that cluster of vectors was generated, that particular first type digital object with the corresponding new second type digital object; and displaying, in a graphical user interface on a device display, at least one of a representation of the recommendation data or a representation of one or more of the new second type digital objects.

In one embodiment, the disclosure provides a system comprising: one or more processors; and one or more computer-readable non-transitory storage media coupled to one or more of the processors and storing instructions operable when executed by one or more of the processors to cause the system to perform operations comprising: digitally storing a plurality of digital objects comprising first type digital objects and second type digital objects, each digital object comprising an electronic digital representation of natural language text; executing first programmed instructions to generate a corpus of digital documents, each digital document of the corpus comprising: the electronic digital representation of natural language text of each particular second type digital object of the plurality of digital objects; and the electronic digital representation of natural language text of each first type digital object associated with that particular second type digital object; executing second programmed instructions to vectorize each digital document of the corpus to generate a first set of vectors; executing third programmed instructions to embed the electronic digital representation of natural language text of each first type digital object not associated with one of the second type digital objects in a vector space of the first set of vectors, thereby generating a second set of vectors, each vector of the second set of vectors being associated with the first type digital object comprising the electronic digital representation of natural language text from which it was embedded; executing fourth programmed instructions to determine, for each vector of the second set of vectors, a corresponding set of nearest neighbor vectors selected from the first set of vectors; executing fifth programmed instructions to generate recommendation data indicating one or more potential new associations between first type digital objects and second type digital objects by: generating, for each vector of the second set of vectors, a similarity metric between that vector and each vector of the corresponding set of nearest neighbor vectors; and comparing the generated similarity metrics to a threshold similarity metric stored in computer memory; programmatically generating a third set of vectors from the specific vectors of the second set of vectors that did not generate any similarity metrics above the threshold similarity metric by embedding each first type digital object associated with those specific vectors in a new vector space; programmatically clustering a plurality of vectors of the third set of vectors, thereby generating one or more clusters of vectors; programmatically generating, for each cluster of vectors, a corresponding new second type digital object; and programmatically associating, for each cluster of vectors, for each particular first type digital object from which a vector in that cluster of vectors was generated, that particular first type digital object with the corresponding new second type digital object; and displaying, in a graphical user interface on a device display, at least one of a representation of the recommendation data or a representation of one or more of the new second type digital objects.

Using these approaches, embodiments can incorporate explainability and transparency into machine learning models. Some implementations can use computer-implemented SaaS systems for automatically associating, at a server computer, correlated digital objects transmitted over a network, thereby creating new digital data relationships that did not previously exist. An implementation can be an automated system such as a computer-implemented SaaS system for generating, at a server computer, new usable digital objects representing natural language text after receiving input digital data objects transmitted over a network from one or more client computing devices.

2.0 Structural & Functional Overview

FIG. 1 illustrates a distributed computer system showing the context of use and principal functional elements with which one embodiment could be implemented. FIG. 1, and the other drawing figures and all the descriptions and claims in this disclosure, are intended to present, disclose, and claim a wholly technical system with wholly technical elements that implement technical methods. In the disclosure, specially programmed computers, using a special-purpose distributed computer system design, execute functions that have not been available before in a new manner using instructions ordered in a new way, to provide a practical application of computing technology to the technical problem of programmatically associating and clustering digital objects comprising digital electronic representations of natural language text. Every step or operation that is functionally described in the disclosure is intended for implementation using programmed instructions that are executed by a computer. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

In one embodiment, a distributed computer system comprises a server computer 110 that is communicatively coupled to client computing device 120 over network 100. Network 100 broadly represents any combination of one or more data communication networks including local area networks, wide area networks, internetworks, or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The server computer 110, the client computing device 120, and other elements of the system may each comprise an interface compatible with the network 100 and may be programmed or configured to use standardized protocols for communication across the networks such as TCP/IP, Bluetooth, or higher-layer protocols such as HTTP, TLS, and the like.

In one embodiment, client computing device 120 may be a computer that includes hardware capable of communicatively coupling the device to one or more server computers, such as server computer 110, over one or more service provides. For example, the client computing device 120 may include a network card that communicates with server computer 110 through a home or office wireless router (not illustrated in FIG. 1) that is communicatively coupled to an internet service provider. The client computing device 120 may be a smartphone, personal computer, tablet computing device, PDA, laptop, or any other computing device capable of transmitting and receiving information and performing the functions described herein.

In one embodiment, the client computing device 120 may comprise device memory 128, operating system 122, application program 124, and application extension 126. In one embodiment, client computing device 120 hosts and executes the application program 124, which the client computing device 120 may download and install from server computer 110, an application store, or another repository. The application program 124 is compatible with server computer 110 and may communicate with the server computer 110 using an app-specific protocol, parameterized HTTP POST and GET requests, and/or other programmatic calls. In some embodiments, application program 124 comprises a conventional internet browser application that is capable of communicating over network 100 to other functional elements via HTTP and is capable of rendering dynamic or static HTML, XML, or other markup languages, including displaying text, images, accessing video windows and players, and so forth. In embodiments, server computer 110 may provide an application extension 126 for application program 124 through which the aforementioned communication and other functionality may be implemented. In some embodiments, a device display 180, such as a screen, may be coupled to the client computing device 120. In one embodiment, device memory 128 may digitally store one or more items depicted as being stored in memory 111.

The server computer 110 may be implemented using a server-class computer or other computer having one or more processor cores, co-processors, or other computers. The server computer 110 may be a physical server computer and/or virtual server instance stored in a data center, such as through cloud computing. In one embodiment, server computer 110 may be implemented using two or more processor cores, clusters, or instances of physical machines or virtual machines, configured in a discrete location, or co-located with other elements in a datacenter, shared computing facility, or cloud computing facility.

In some embodiments, client computing device 120 is only one of a number of client computing devices interconnected with server computer 110. There may be potentially many more client computing devices employed in executing the systems and methods described herein. On the other hand, some embodiments may not use Client-Server architecture and may instead implement the disclosed programmed processes on-device; thus, the disclosed architecture is exemplary.

Referring again to FIG. 1, in one embodiment, server computer 110 may comprise data processing instructions 104 coupled to both presentation instructions 102 and memory 111. The memory 111 may represent any memory accessible by the server computer 110 including a relational database, a data lake, cloud data storage, local hard drives, computer main memory, or any other form of electronic memory. In one embodiment, data is stored in a POSTGRESQL object-relational database and exposed as GRAPHQL to the frontend. In various embodiments, server computer 110 may store and execute sequences of programmed instructions of various types to cause execution of various methods. In example only, server computer 110 may execute the data processing instructions 104 and the presentation instructions 102 in various programmed methods, but server computer 110 may also execute other types of programmed instructions in particular embodiments. The data processing instructions 104 may be executed by the server computer 110 to process or transform data, such as by executing a programmed machine learning model, or to cause data stored in memory 111 to be transmitted to client computing device 120 over the network 100. In various embodiments, presentation instructions 102 may be executed by server computer 110 to cause presentation in a display of a computing device communicating with server computer 110 over network 100 (such as client computing device 120) or to cause the transmission of display instructions to such a computing device, the display instructions formatted to cause such presentation upon execution.

Rather than comprising a general-purpose computer, the server computer 110 is specially configured or programmed with the functional elements shown in FIG. 1. In one embodiment, server computer 110 digitally stores a plurality of digital objects comprising a set of first type digital objects 130 and a set of second type digital objects 132 in memory 111. The first type may be a feature type and the second type may be a product gap type, the product gap type being used to digitally represent Product Gaps in computer memory. The feature gap type may comprise an opportunity gap type and an account gap type. The opportunity gap type may be used to digitally represent Opportunity Gaps in computer memory and the account gap type may be used to digitally represent Account Gaps in computer memory. Thus, within the set of first type digital objects 130 is a set of opportunity gaps 112 comprising digital objects with the opportunity gap type and a set of account gaps 114 comprising digital objects with the account gap type. Similarly, within the set of second type digital objects is a set of product gaps 116 comprising digital objects with the product gap type. Each digital object of the set of first type digital objects 130 and the set of second type digital objects 132 may comprise an electronic digital representation of natural language text. In one embodiment, each digital electronic digital representation of natural language text represents a name and a description of that object.

For example, an opportunity gap type digital object might have a name such as "Company A Pre-Sales Platform Clustering" and the description in the following Table 1.

Table 1—Example Opportunity Gap Description

"In order to close this deal, it would be great if the Pre-Sales Platform we are trying to sell to the prospect had an advanced automated clustering feature. The client expressed that automatic clustering of Opportunity Gaps and Account Gaps into Product Gaps would save them so much time and really help for planning programming priorities for their programming teams in SCRUM meetings. The client said that if we don't implement clustering capabilities, then they will certainly go with Vivun Inc.'s product."

Referring again to FIG. 1, certain ones of the set of first type digital objects 130 may each be associated or linked with exactly one of the second type digital objects of the set of second type digital objects 132. In one embodiment, a second type digital object may be associated with 0, 2, or more first type digital objects. In one embodiment, a first type digital object may be associated with 0 or 1 second type digital objects. In one embodiment, such an association specified in computer memory may digitally represent a plurality of Account Gaps and/or Opportunity Gaps being linked to a single Product Gap.

In one embodiment, server computer 110 digitally stores a corpus of digital documents 140 in memory 111. In one embodiment, server computer 110 may execute programmed instructions formatted to cause generating the corpus of digital documents 140 from the set of first type digital objects 130 and the set of second type digital objects 132. In one embodiment, each digital document of the corpus of digital documents 140 comprises the electronic digital representation of natural language text of each particular second type digital object of the plurality of digital objects and the electronic digital representation of natural language text of each first type digital object associated with that particular second type digital object.

In one embodiment, server computer 110 digitally stores, in memory 111, a first set of vectors 150 which may be generated by vectorizing each digital document of the corpus. In other words, the documents of the corpus of digital documents 140 may be programmatically embedded in a vector space. In one embodiment, server computer 110 executes programmed instructions formatted to cause tokenizing and/or sanitizing the documents of the corpus of digital documents 140 before they are vectorized. Sanitization may include white space removal, stemming, and/or other preprocessing operations. In one embodiment, the vector space and each vector of the first set of vectors 150 is N-dimensional, where there are N unique words or tokens represented in the corpus of digital documents 140. In one embodiment, the documents of the corpus of digital documents 140 are programmatically vectorized using the TF- IDF algorithm, but other algorithms may also be used in various embodiments. One embodiment uses TF-IDF algorithm functionality from the GENSIM code library, but other embodiments may use other code libraries known in the relevant arts to achieve similar functionality.

In one embodiment, server computer 110 digitally stores a second set of vectors 152 in memory 111. In one embodiment, server computer 110 executes programmed instructions formatted to cause embedding the electronic digital representation of natural language text of each first type digital object of the set of first type digital objects 130 not associated with one of the second type digital objects of the set of second type digital objects 132 in the vector space of the first set of vectors, thereby generating a second set of vectors 152, each vector of the second set of vectors 152 being associated with the first type digital object comprising the electronic digital representation of natural language text from which it was embedded. Thus, in one embodiment, the digital objects representing Opportunity Gaps and Account Gaps not associated with any Product Gaps are programmatically used to generate the second set of vectors 152. In various embodiments, the second set of vectors 152 may also be generated by using a TF-IDF algorithm or another algorithm, but, in any case, the second set of vectors 152 resides in the same N-dimensional vector space as the first set of vectors 150, and they may be generated programmatically using the corpus of digital documents 140.

In one embodiment, server computer 110 digitally stores corresponding sets of nearest neighbor vectors 154 in memory 111. In one embodiment, server computer 110 may be programmed to determine for each vector of the second set of vectors 152, a corresponding set of nearest neighbor vectors 154 selected from the first set of vectors 150. In various embodiments, server computer 110 may execute programmed instructions formatted to cause solving a k-nearest neighbor problem or an ε-approximate nearest neighbor problem. For example, server computer 110 may be programmed to execute exact methods such as linear search or a space partitioning method, or approximation methods such as greedy search methods, locality sensitive hashing (LSH), vector approximation file methods, or other compression/clustering-based search methods.

In one embodiment, server computer 110 may execute programmed instructions formatted to cause generating, at least partly based on the determined sets of nearest neighbor vectors 154, recommendation data 162 indicating one or more potential new associations between first type digital objects and second type digital objects. In one embodiment, server computer 110 is programmed to generate the recommendation data 162 by first generating, for each vector of the second set of vectors 152, a similarity metric between that vector and each vector of the corresponding set of nearest neighbor vectors 154. In one embodiment, the similarity metric is a cosine similarity metric, but other types of similarity metrics may also be used. In one embodiment, server computer 110 digitally stores the similarity metrics 160 in memory 111. In one embodiment, server computer 110 may be programmed to subsequently compare the generated similarity metrics 160 to a threshold similarity metric stored in computer memory 111. An example threshold cosine similarity metric may be 0.1, 0.2, or 0.3. In one embodiment, the threshold cosine similarity metric may be expressed as a percentage, such as 10%, 15%, 20%, 25%, 30%, or the like. When a similarity metric between two digital objects is above the threshold similarity metric, that may suggest that the digital objects are related to a sufficient degree such that an association between the digital objects in computer memory 111 would improve the functioning of server computer 110.

In one embodiment, the recommendation data 162 may indicate potential new associations between an account gap type object and an existing product gap type object or between an opportunity gap type object and an existing product gap type object. As explained further herein with greater specificity, server computer 110 may be programmed to display, in a graphical user interface on device display 180, a representation of the recommendation data 162.

In one embodiment, server computer 110 may be programmed to, based on the recommendation data 162, associate a corresponding first type digital object with a corresponding second type digital object, thereby forming a digital data relationship that did not previously exist. One or more of these data links or new associations 164 may be digitally stored in memory 111.

In one embodiment, the platform is programmed with a suggestions feature that may provide suggestions to a user of client computing device 120 based on the similarity metrics 160 and/or the recommendations data 162. In one embodiment, one or more of the new associations 164 is formed after receiving a first digital input 166 indicating approval of one of the one or more potential new associations between first type digital objects and second type digital objects indicated by the recommendation data 162. This first digital input 166 may be received, for example, from client computing device 120. In one embodiment, server computer 110 is further programmed to cause displaying in the graphical user interface on the device display 180, a representation of the digital data relationship that did not previously exist.

In one embodiment, the platform is programmed with a clustering feature that executes operations to create new, useable second type digital objects and associates those new second type digital objects with first type digital objects. Thus, in one embodiment, new digital objects representing Product Gaps may be created and associated with existing digital objects representing Account Gaps and Opportunity Gaps, thereby improving the functioning of server computer 110.

In one embodiment, server computer 110 executes programmed instructions formatted to cause generating a third set of vectors 154 from the specific vectors of the second set of vectors 152 that did not generate any similarity metrics above the threshold similarity metric by embedding each first type digital object associated with those specific vectors in a new vector space. Server computer 110 may subsequently execute programmed instructions formatted to cause clustering a plurality of vectors of the third set of vectors 154, thereby generating one or more clusters of vectors 170. In one embodiment, each of the third set of vectors 154 and the one or more clusters of vectors 170 are digitally stored in memory 111.

In one embodiment, server computer 110 performs said clustering operations by executing programmed instructions implementing a Gridsearch algorithm to find k optimal clusters by Silhouette Score and further implementing a K-Means algorithm to perform the clustering. Hence, if the third set of vectors 154 comprised, for example, M vectors, then server computer 110 might programmatically execute the following operations: (1) use a K-Means algorithm to generate 1 cluster and calculate the Silhouette Score for that potential clustering, (2) use the K-Means algorithm to generate 2 clusters and calculate the Silhouette Score for that potential clustering, (3) use the K-Means algorithm to generate 3 clusters and calculate the Silhouette Score for that potential clustering, . . . , (M) use K-Means clustering to generate M clusters and calculate the Silhouette Score for that potential clustering, (M+1) select the potential clustering that outputs the greatest Silhouette Score. However, some embodiments may be programmed to select a clustering using additional selection criteria, instead of naively selecting the clustering approach leading to the greatest Silhouette Score. For example, server computer 110 may be programmed to apply a penalty term proportional to a number of clusters generated in a particular run. Such embodiments may favor fewer clusters, leading to simpler solutions.

In various embodiments, a different clustering algorithm may be used such as hierarchical clustering, fuzzy c means, mean shift, DBSCAN, Gaussian Mixed Models (GMM), or another type of clustering algorithm. In various embodiments, a Davis-Boudin Index, a Dunn Index, Normalized Mutual Information, or another type of index, score, measure, or metric may be used to programmatically evaluate the quality of the clusters. In one embodiment, Silhouette Scores are computed using the SKLEARN PYTHON library, but other embodiments may rely on other code libraries known in the relevant arts to perform some functionality.

In one embodiment, based on the clusters of vectors 170 stored in memory 111, server computer 110 may execute programmed instructions formatted to cause: generating, for each cluster of vectors, a corresponding new second type digital object; and associating, for each cluster of vectors, for each particular first type digital object from which a vector in that cluster of vectors was generated, that particular first type digital object with the corresponding new second type digital object. Hence, a new digital object representing a Product Gap may be created and each digital object representing an Account Gap or Opportunity Gap effectively clustered together to generate that new digital object may be systematically associated with it. As explained further herein with more specificity, some embodiments are programmed to associate the appropriate account gap type and opportunity gap type digital objects with the new product gap type digital object responsive to receiving a second digital input 168 indicating approval of a resulting new digital data relationship. In one example, the second digital input 168 may be a graphical input transmitted from client computing device 120 using the graphical user interface.

Figure 2A:
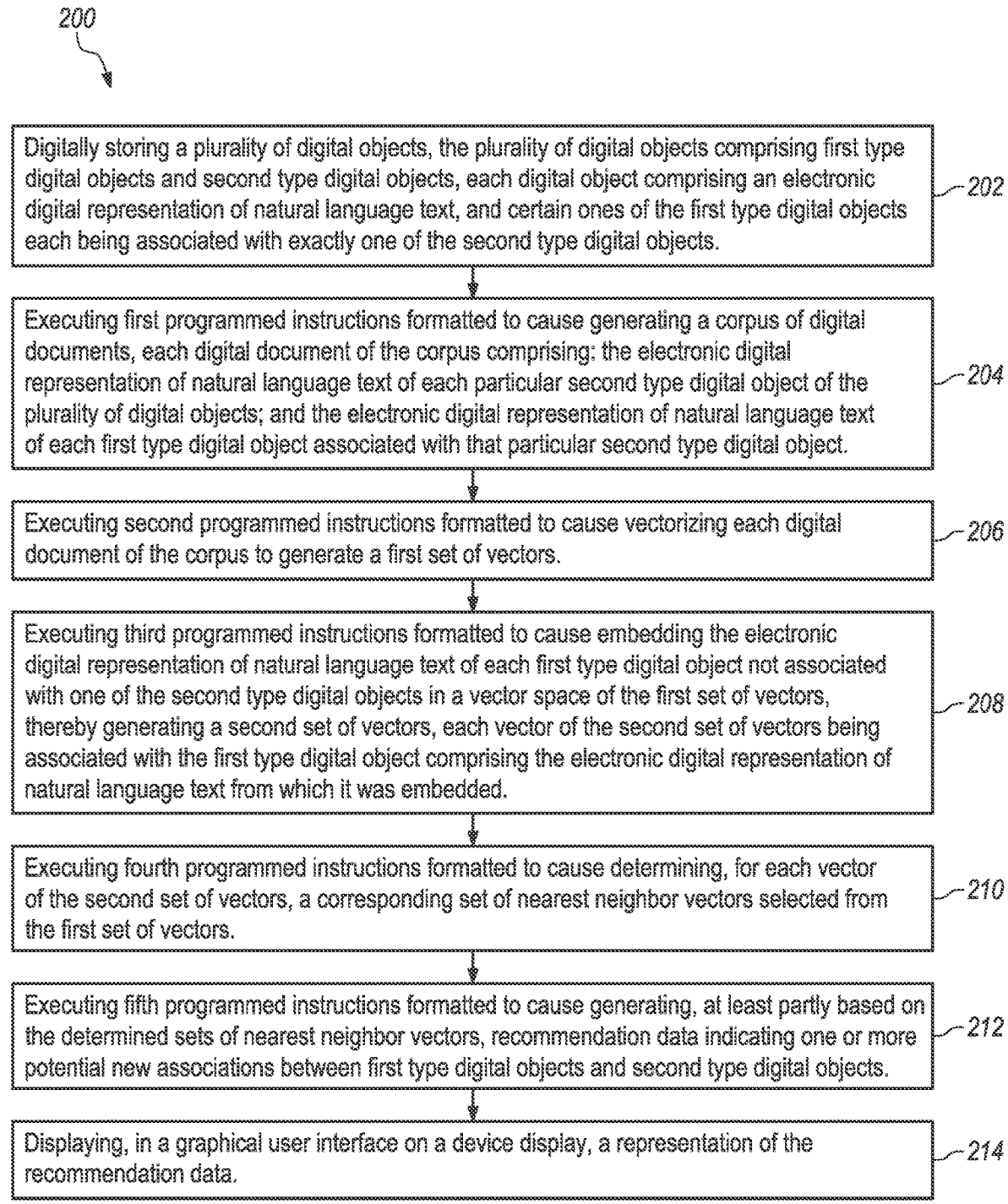
FIG. 2A illustrates an example computer-implemented or programmed process for forming and displaying new digital data relationships that did not previously exist, in an embodiment.

3.0 Example Automated Digital Data Relationship Formation Process and Output FIG. 2A illustrates an example computer-implemented or programmed process for forming and displaying new digital data relationships that did not previously exist, in an embodiment. FIG. 2A and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

In one embodiment, a process 200 is programmed to start execution at step 202 by digitally storing a plurality of digital objects, the plurality of digital objects comprising first type digital objects and second type digital objects, each digital object comprising an electronic digital representation of natural language text, and certain ones of the first type digital objects each being associated with exactly one of the second type digital objects.

In one embodiment, process 200 is programmed to subsequently execute step 204 by executing first programmed instructions formatted to cause generating a corpus of digital documents, each digital document of the corpus comprising: the electronic digital representation of natural language text of each particular second type digital object of the plurality of digital objects; and the electronic digital representation of natural language text of each first type digital object associated with that particular second type digital object. In one embodiment, the platform is programmed to provide a plurality of organizations each with a unique vector space or Index, based on that organization's relevant documents.

In one embodiment, process 200 is programmed to subsequently execute step 206 by executing second programmed instructions formatted to cause vectorizing each digital document of the corpus to generate a first set of vectors.

In one embodiment, process 200 is programmed to subsequently execute step 208 by executing third programmed instructions formatted to cause embedding the electronic digital representation of natural language text of each first type digital object not associated with one of the second type digital objects in a vector space of the first set of vectors, thereby generating a second set of vectors, each vector of the second set of vectors being associated with the first type digital object comprising the electronic digital representation of natural language text from which it was embedded.

In one embodiment, process 200 is programmed to subsequently execute step 210 by executing fourth programmed instructions formatted to cause determining, for each vector of the second set of vectors, a corresponding set of nearest neighbor vectors selected from the first set of vectors.

In one embodiment, process 200 is programmed to subsequently execute step 212 by executing fifth programmed instructions formatted to cause generating, at least partly based on the determined sets of nearest neighbor vectors, recommendation data indicating one or more potential new associations between first type digital objects and second type digital objects. In one embodiment, process 200 or certain sub steps, such as step 212, may be calculated offline in batch. In one embodiment, a model training and pipeline process for generating "suggestions" may be rerun periodically every Z hours (for example, every 1, 2, or 3 hours).

In one embodiment, process 200 is programmed to subsequently execute step 214 by displaying, in a graphical user interface on a device display, a representation of the recommendation data.

Figure 3:
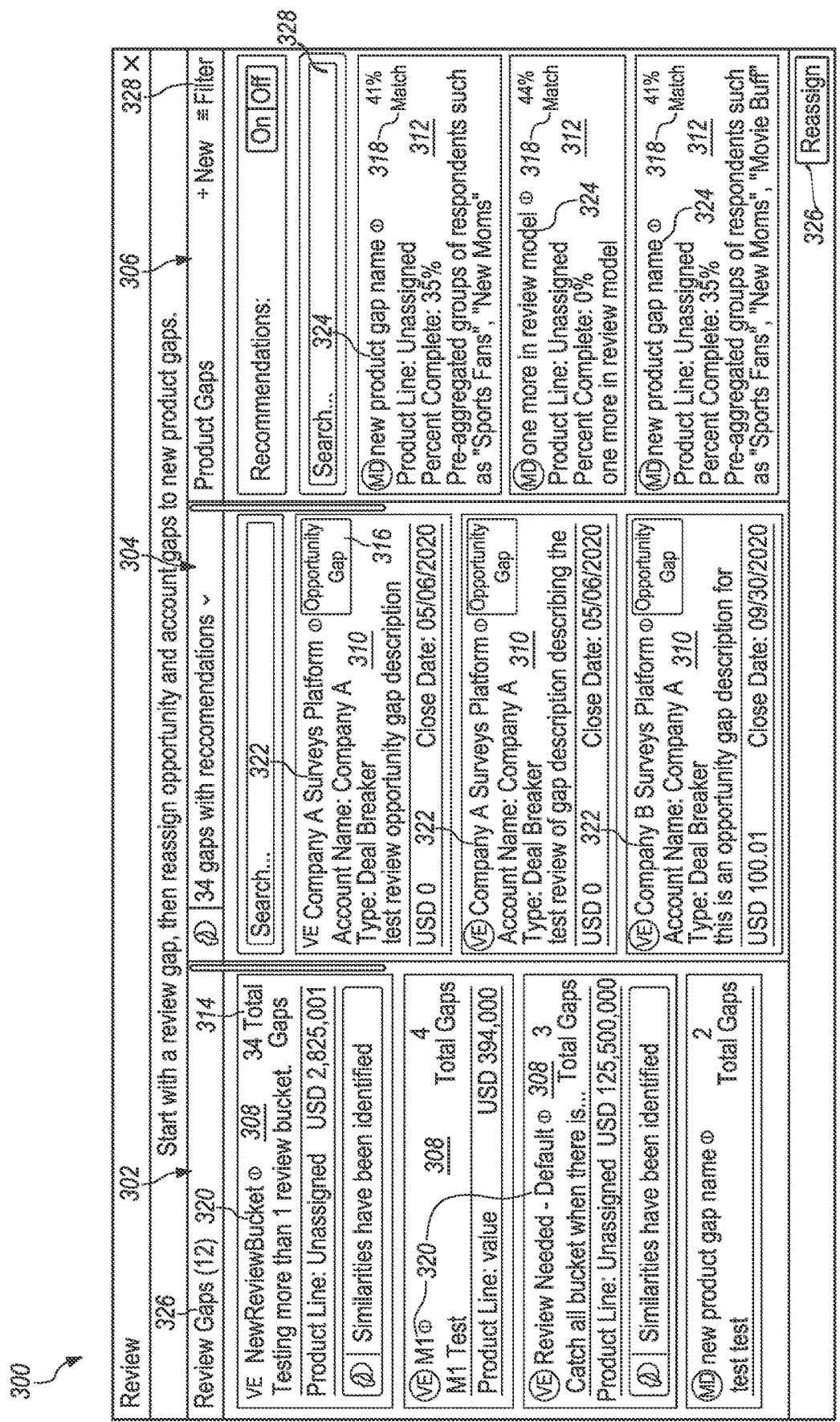
FIG. 3 illustrates example output of the programmed process of FIG. 2A which may facilitate an Opportunity Gap or Account Gap being associated with an existing Product Gap.

FIG. 3 illustrates example output of the programmed process of FIG. 2A which may facilitate associating an Opportunity Gap or Account Gap with an existing Product Gap.

FIG. 3 illustrates an example First Review Pane 300 that may be displayed in a graphical user interface on a device display 180 of a client computing device 120, in one embodiment. The Review Pane 300 of the depicted embodiment comprises: (1) a Review Gaps column 302 comprising a plurality of Review Buckets 308, (2) an Opportunity and Account Gaps column 304 comprising a plurality of Representations of Opportunity Gaps 310, and (3) a Product Gap column 306 comprising a plurality of Representations of Product Gaps 312. Although not depicted in FIG. 3, the Opportunity and Account Gaps column 304 may be expected to comprise one or more Representations of Account Gaps 420 (FIG. 4) in certain instances. In particular instances, one or more of the aforementioned columns 302, 304, 306 may be expected to contain zero, one, or more items depending on the data digitally stored or accessed by the platform.

In one embodiment, the Review Gaps column 302 has a title 326, in this case stating, "Review Gaps," and an indication of a number of Review Buckets 308 in the column, in this case "12." The other columns (such as columns 304, 306) may be labeled in a similar manner in particular embodiments. In one embodiment, each Review Bucket 308 has a Review Bucket name 320. In one embodiment, when the platform receives input indicating a selection of a particular Review Bucket 308, for example from a user of client computing device 120 using a control device such as a mouse or trackpad, this programmatically triggers the platform to execute operations causing one or more associated Representations of Opportunity Gaps 310 and Representations of Account Gaps 420 to populate in column 304. In one embodiment, each of the populated items in column 304 is a representation of a first type digital object. In one embodiment, each of the populated items in column 304 is a representation of a feature type digital object, such as an opportunity gap type digital object representing an Opportunity Gap or an account gap type digital object representing an Account Gap.

In one embodiment, each of the Representations of Opportunity Gaps 310 has a name 322 and a description. In some embodiments, the entire description may not be displayed in the graphical user interface, for example, when the description is longer than could practicably be displayed. In the depicted embodiment, the portions of the Opportunity Gap descriptions displayed are "test review opportunity gap description," "test review of gap description describing the," and "this is an opportunity gap description for."

In one embodiment, when the platform receives input indicating a selection of one of the Representations of Opportunity Gaps 310 in column 304, for example, from a user of client computing device 120 using a control device such as a mouse or trackpad, this programmatically triggers the platform to execute operations causing one or more Representations of Product Gaps 312 to populate in column 306. In one embodiment, each of the populated items in column 306 is a representation of a second type digital object, such as a product gap type digital object representing a Product Gap. In one embodiment, each of the Representations of Product Gaps 312 has a name 324 and a Match Percentage 318. In one embodiment, the Match Percentages 318 are one example representation of Recommendation Data 162 indicating a potential new association between a first type digital object and a second type digital object. In one embodiment, the Match Percentage 318 is a function of a Similarity Metric 160, such as a Cosine Similarity Metric indicating a strength of association between one of an Opportunity Gap or Account Gap represented in column 304 and a Product Gap 312 represented in column 306. Said Recommendation Data 162 and Similarity Metrics 160 may have been programmatically generated according to the suggestion techniques described herein with more specificity.

In one embodiment, a "Reassign" Button 326 or other interface element facilitates the receipt of a First Digital Input 166 indicating approval for the creation of a New Association 164 between one of an Opportunity Gap or an Account Gap and a Product Gap represented in memory 111. Although not necessarily depicted in FIG. 3, once a first type digital object has been programmatically associated with a second type digital object, thereby forming a digital data relationship that did not previously exist, the platform may cause displaying, in the graphical user interface, a representation of the digital data relationship that did not previously exist. For example, responsive to subsequently receiving input indicating a selection of the relevant Product Gap, the platform may be programmed to display a representation of the first type digital object, which is one possible representation of the digital data relationship that did not previously exist. A "Filter" Button 328 or another type of interface element may allow for filtering results based on a variety of data fields or metadata stored in memory 111. One or more "Search" Fields 328 may allow for searching results based on a variety of data fields or metadata stored in memory 111.

4.0 Example Automated Product Gap Clustering Process and Output

Figure 2B:
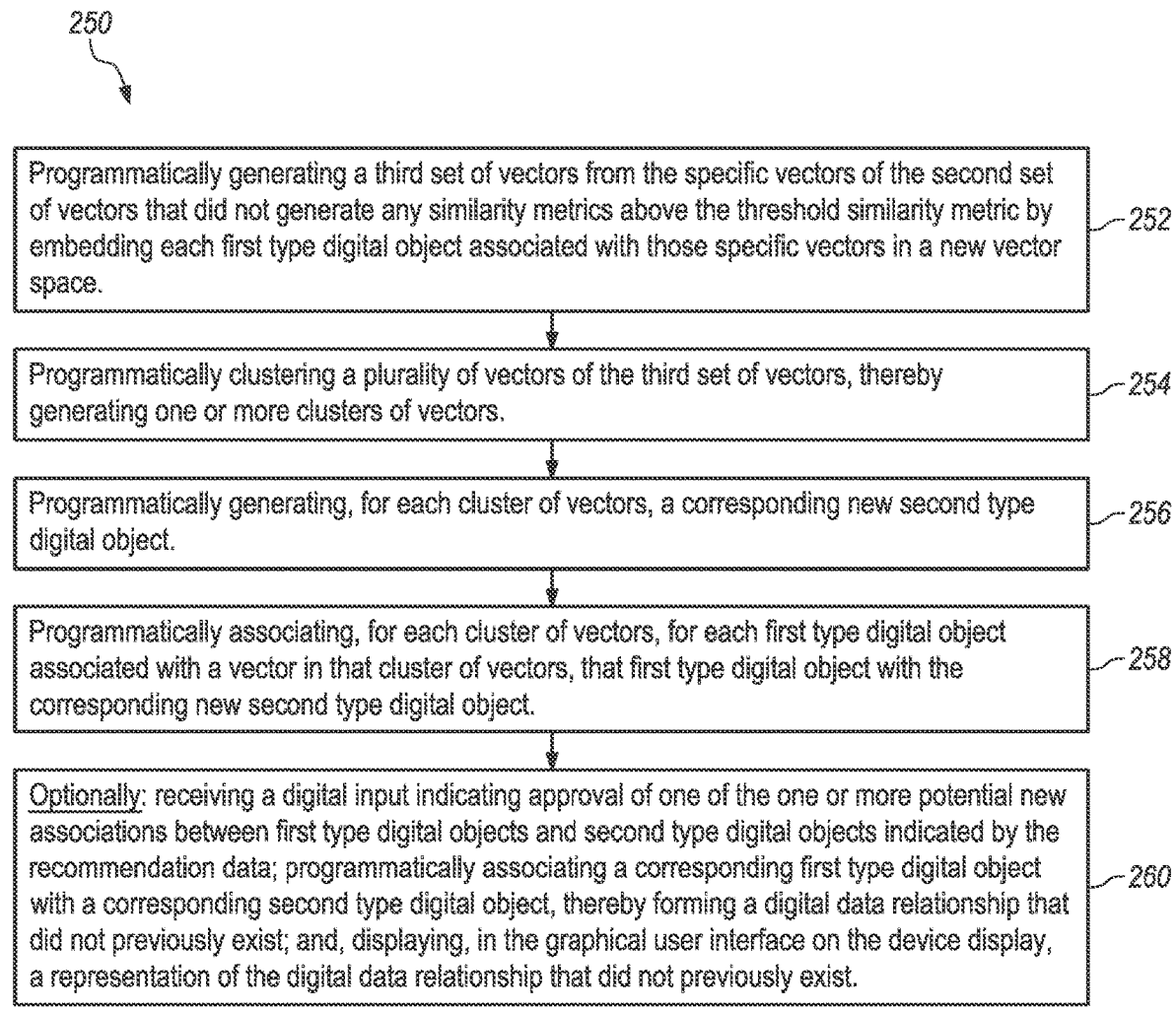
FIG. 2B illustrates an example computer-implemented or programmed process for generating and displaying new usable digital objects, in an embodiment.

FIG. 2B illustrates an example computer-implemented or programmed process for generating and displaying new usable digital objects, in an embodiment.

In one embodiment, a process 250 is programmed to start execution at step 252 by programmatically generating a third set of vectors from the specific vectors of the second set of vectors that did not generate any similarity metrics above the threshold similarity metric by embedding each first type digital object associated with those specific vectors in a new vector space.

In one embodiment, process 250 is programmed to subsequently execute step 254 by programmatically clustering a plurality of vectors of the third set of vectors, thereby generating one or more clusters of vectors.

In one embodiment, process 250 is programmed to subsequently execute step 256 by programmatically generating, for each cluster of vectors, a corresponding new second type digital object.

In one embodiment, process 250 is programmed to subsequently execute step 258 by programmatically associating, for each cluster of vectors, for each first type digital object associated with a vector in that cluster of vectors, that first type digital object with the corresponding new second type digital object. In one embodiment, process 250 or certain sub steps, such as step 258, may be calculated offline in batch. In one embodiment, a model training and pipeline process for "clustering" may be rerun periodically every Z hours and potentially immediately following a "suggestions" process.

In one embodiment, process 250 is optionally programmed to subsequently execute step 260 by receiving a digital input indicating approval of one of the one or more potential new associations between first type digital objects and second type digital objects indicated by the recommendation data; programmatically associating a corresponding first type digital object with a corresponding second type digital object, thereby forming a digital data relationship that did not previously exist; and, displaying, in the graphical user interface on the device display, a representation of the digital data relationship that did not previously exist.

Figure 4:
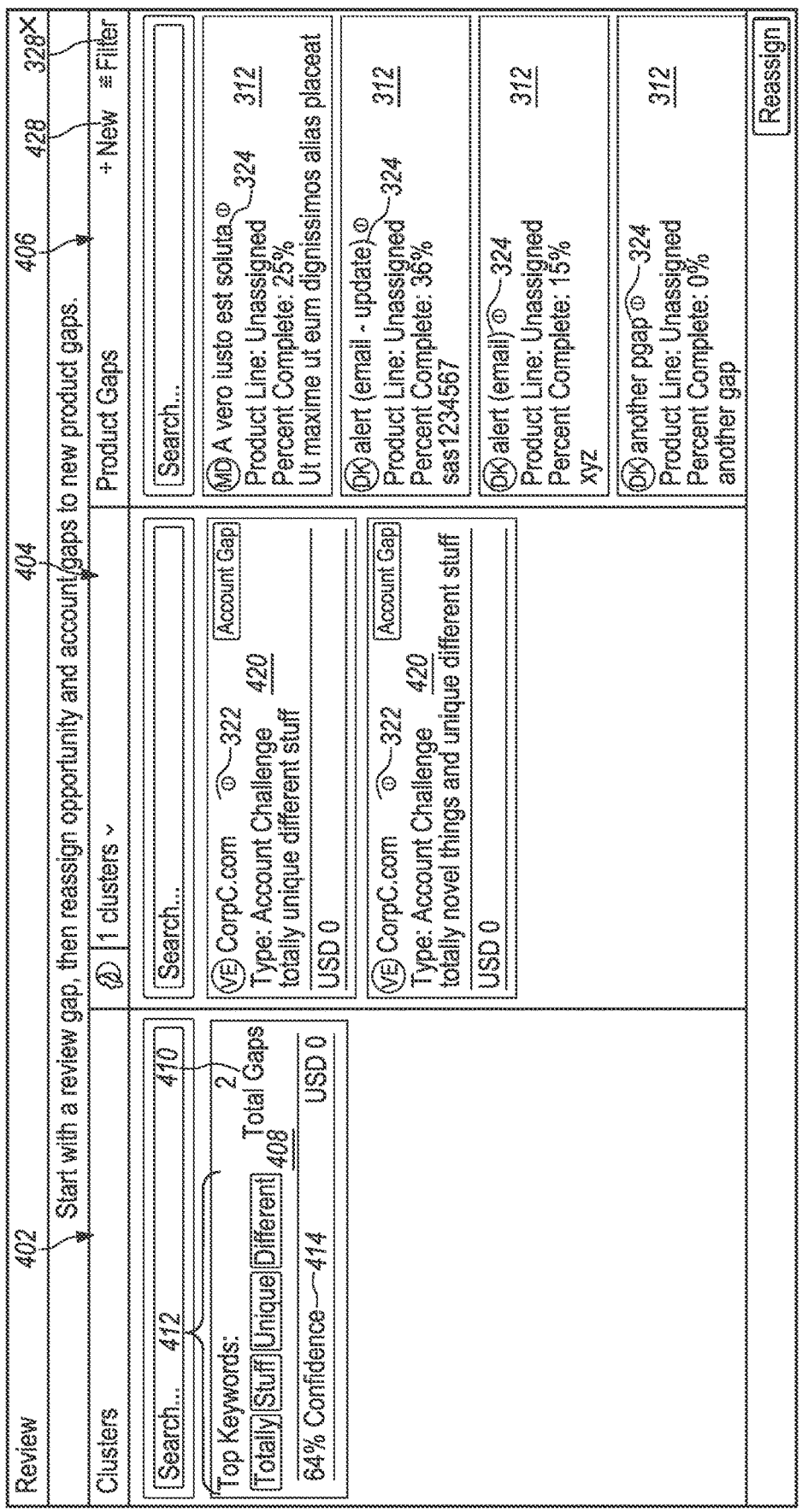
FIG. 4 illustrates example output of the programmed process of FIG. 2B which may facilitate the creation of a new Product Gap.

FIG. 4 illustrates example output of the programmed process of FIG. 2B which may facilitate the creation of a new Product Gap.

FIG. 4 illustrates an example Second Review Pane 400 that may be displayed in a graphical user interface on a device display 180 of a client computing device 120, in one embodiment. The Review Pane 400 of the depicted embodiment comprises: (1) a Clusters column 402 comprising one or more Cluster Representations 408, (2) a Clustered Opportunity and Account Gaps column 404 comprising a plurality of Representations of Account Gaps 420, and (3) an Existing Product Gap column 406 comprising a plurality of Representations of Product Gaps 312. Although not depicted in FIG. 3, the Clustered Opportunity and Account Gaps column 404 may be expected to comprise one or more Representations of Opportunity Gaps 310 (FIG. 3) in certain instances. In particular instances, one or more of the aforementioned columns 402, 404, 406 may be expected to contain zero, one, or more items depending on the data digitally stored or accessed by the platform. In one embodiment, each Cluster Representation 408 may have a designation 410 indicating a total number of gaps in the represented cluster. In one embodiment, each of the Representations of Account Gaps 420 has a name 322 and a description. In the depicted embodiment, each of the names is "CorpC.com" and the descriptions are "totally unique different stuff" and "totally novel things and unique different stuff."

In one embodiment, each of the Representations of Account Gaps 420 and Representations of Opportunity Gaps 310 populated in column 404 has been programmatically determined to be associated with a cluster represented by a selected Cluster Representation 408 displayed in column 402, for example, according to the "clustering" techniques described herein with more specificity.

In one embodiment, a "New" Button 428 or other interface element facilitates the receipt of a Second Digital Input 168 indicating approval for the creation of a new product gap type digital object in memory 111 and/or the association of one or more opportunity gap type digital objects or account gap type digital objects with the new product gap type digital object. Thus, one or more Account Gaps or Opportunity Gaps represented in column 404 as being associated with a particular cluster represented in column 402 may be grouped and associated with the new Product Gap represented in memory 111. In one embodiment, a Confidence Score 414 indicates a programmatically calculated strength of association for the new digital data relationship represented by the associating. In one embodiment this displayed Confidence Score 414 is a function of the maximum Silhouette Score associated with the relevant cluster. In one embodiment, one or more of the Cluster Representations 408 are also displayed with a corresponding set of natural language keywords 412. In one embodiment, the corresponding set of natural language keywords 412 of the cluster may be generated by determining, based on the programmatically calculated center point of the cluster (in the vector space) provided by executing the K-Means algorithm, a set of N closest tokens to said center point. In one embodiment, the keywords linked to those N tokens are the corresponding set of natural language keywords of the cluster 412. Moreover, an example representation of the new digital data relationship represented by the associating may be displayed by populating the relevant Representations of Account Gaps 420 and Representations of Opportunity Gaps 310 representing the clustered objects in column 404 when a specific Cluster Representation 408 is selected in column 402.

5.0 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
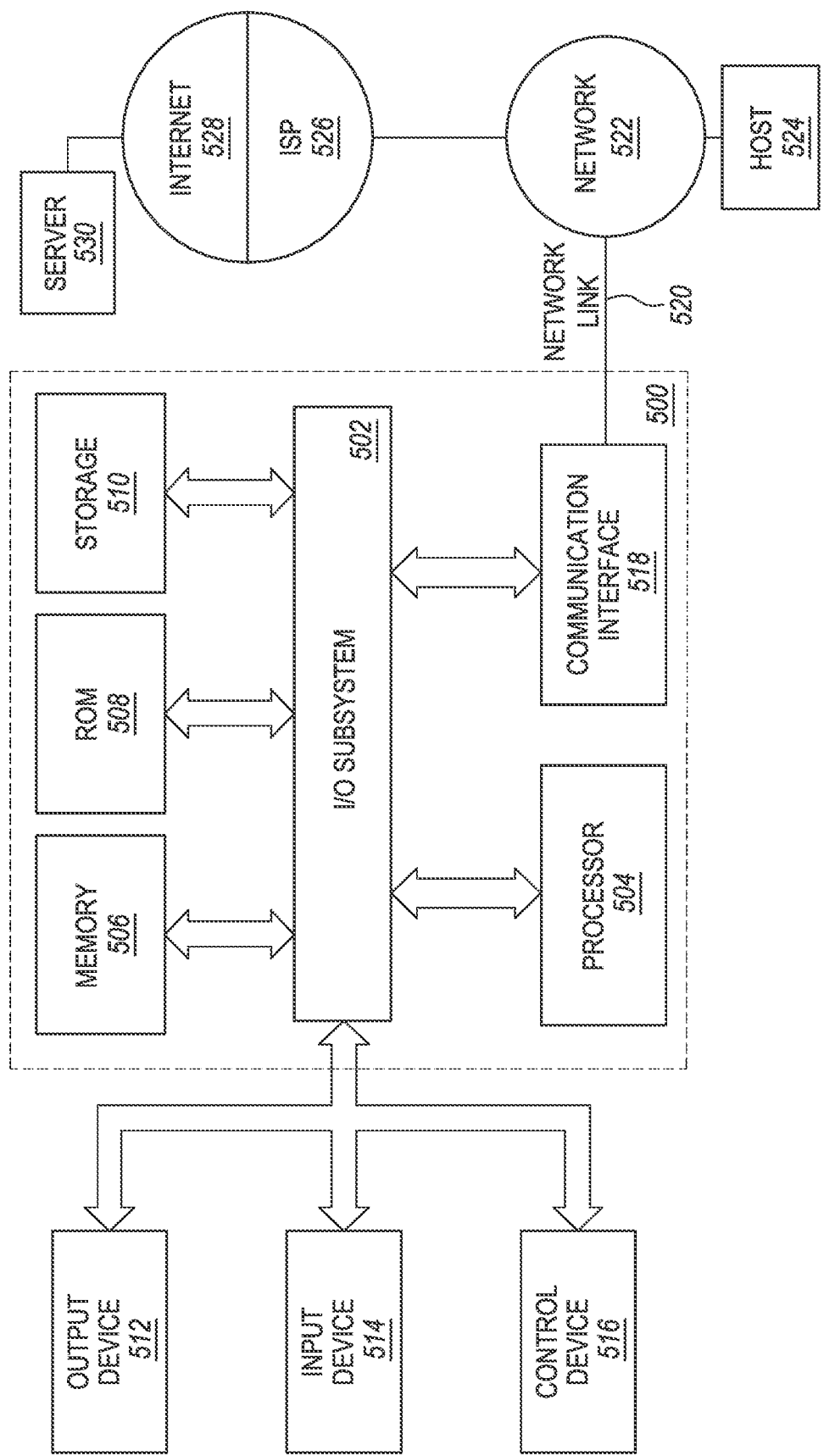
FIG. 5 is a block diagram that illustrates a computer system upon which one embodiment may be implemented.

For example, FIG. 5 is a block diagram that illustrates a computer system 500 upon which one embodiment may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (for example, x) and a second axis (for example, y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (for example, private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method, comprising:
digitally storing a plurality of digital objects comprising first type digital objects and second type digital objects, each digital object comprising an electronic digital representation of natural language text;
generating a corpus of digital documents, each digital document of the corpus comprising:
the electronic digital representation of natural language text of each particular second type digital object of the plurality of digital objects; and
the electronic digital representation of natural language text of each first type digital object associated with that particular second type digital object;
vectorizing each digital document of the corpus to generate a first set of vectors;
embedding the electronic digital representation of natural language text of each first type digital object not associated with one of the second type digital objects in a vector space of the first set of vectors, thereby generating a second set of vectors, each vector of the second set of vectors being associated with each first type digital object comprising the electronic digital representation of natural language text from which it was embedded;
determining, for each vector of the second set of vectors, a corresponding set of nearest neighbor vectors selected from the first set of vectors;
generating, at least partly based on the determined sets of nearest neighbor vectors, recommendation data indicating one or more potential new associations between first type digital objects and second type digital objects; and
displaying, in a graphical user interface on a device display, a representation of the recommendation data.

2. The computer-implemented method of claim 1, wherein generating the recommendation data comprises:
generating, for each vector of the second set of vectors, a similarity metric between that vector and each vector of the corresponding set of nearest neighbor vectors; and
comparing the generated similarity metrics to a threshold similarity metric stored in computer memory.

3. The computer-implemented method of claim 2, further comprising:
generating a third set of vectors from specific vectors of the second set of vectors that did not generate any similarity metrics above the threshold similarity metric by embedding each first type digital object associated with those specific vectors in a new vector space;
clustering a plurality of vectors of the third set of vectors, thereby generating one or more clusters of vectors;
generating, for each cluster of vectors, a corresponding new second type digital object; and
associating, for each cluster of vectors, for each particular first type digital object from which a vector in that cluster of vectors was generated, that particular first type digital object with the corresponding new second type digital object.

4. The computer-implemented method of claim 3, wherein clustering the plurality of vectors comprises implementing a Gridsearch algorithm to find K optimal clusters by Silhouette Score and being further programmed to implement a K-Means algorithm.

5. The computer-implemented method of claim 3, further comprising, prior to associating at least one of the first type digital objects with the corresponding new second type digital object, receiving a digital input indicating approval of a new digital data relationship represented by the associating.

6. The computer-implemented method of claim 1, the first type being a feature type, the feature type comprising an opportunity gap type and an account gap type, and the second type being a product gap type.

7. The computer-implemented method of claim 3, the first type being a feature type, the feature type comprising an opportunity gap type and an account gap type, and the second type being a product gap type.

8. The computer-implemented method of claim 1, each electronic digital representation of natural language text representing a name and a description.

9. The computer-implemented method of claim 3, each electronic digital representation of natural language text representing a name and a description.

10. The computer-implemented method of claim 1, further comprising tokenizing and sanitizing each digital document of the corpus.

11. The computer-implemented method of claim 3, further comprising tokenizing and sanitizing each digital document of the corpus.

12. The computer-implemented method of claim 1, further comprising:
receiving a digital input indicating approval of one of the one or more potential new associations between first type digital objects and second type digital objects indicated by the recommendation data;
programmatically associating a corresponding first type digital object with a corresponding second type digital object, thereby forming a digital data relationship that did not previously exist; and
displaying, in the graphical user interface on the device display, a representation of the digital data relationship that did not previously exist.

13. The computer-implemented method of claim 3, further comprising:
receiving a digital input indicating approval of one of the one or more potential new associations between first type digital objects and second type digital objects indicated by the recommendation data;
programmatically associating a corresponding first type digital object with a corresponding second type digital object, thereby forming a digital data relationship that did not previously exist; and
displaying, in the graphical user interface on the device display, a representation of the digital data relationship that did not previously exist.

14. The computer-implemented method of claim 3, the similarity metric being a Cosine Similarity metric.

15. The computer-implemented method of claim 5, further comprising displaying, in the graphical user interface on the device display, prior to receiving the digital input indicating approval of the new digital data relationship represented by the associating, a representation of the new digital data relationship represented by the associating with a confidence score indicating a programmatically calculated strength of association.

16. The computer-implemented method of claim 5, further comprising:
programmatically determining a set of natural language keywords for at least one cluster; and displaying, in the graphical user interface on the device display, the set of natural language keywords with a representation of the new digital data relationship represented by the associating.

17. One or more computer-readable non-transitory storage media storing instructions operable when executed by one or more processors to cause performance of:
   digitally storing a plurality of digital objects comprising first type digital objects and second type digital objects, each digital object comprising an electronic digital representation of natural language text;
   generating a corpus of digital documents, each digital document of the corpus comprising:
      the electronic digital representation of natural language text of each particular second type digital object of the plurality of digital objects; and
      the electronic digital representation of natural language text of each first type digital object associated with that particular second type digital object;
   vectorizing each digital document of the corpus to generate a first set of vectors;
   embedding the electronic digital representation of natural language text of each first type digital object not associated with one of the second type digital objects in a vector space of the first set of vectors, thereby generating a second set of vectors, each vector of the second set of vectors being associated with each first type digital object comprising the electronic digital representation of natural language text from which it was embedded;
   determining, for each vector of the second set of vectors, a corresponding set of nearest neighbor vectors selected from the first set of vectors;
   generating recommendation data indicating one or more potential new associations between first type digital objects and second type digital objects by:
      generating, for each vector of the second set of vectors, a similarity metric between that vector and each vector of the corresponding set of nearest neighbor vectors; and
      comparing the generated similarity metrics to a threshold similarity metric stored in computer memory;
   generating a third set of vectors from the specific vectors of the second set of vectors that did not generate any similarity metrics above the threshold similarity metric by embedding each first type digital object associated with those specific vectors in a new vector space;
   clustering a plurality of vectors of the third set of vectors, thereby generating one or more clusters of vectors;
   generating, for each cluster of vectors, a corresponding new second type digital object; and
   associating, for each cluster of vectors, for each particular first type digital object from which a vector in that cluster of vectors was generated, that particular first type digital object with the corresponding new second type digital object; and
   displaying, in a graphical user interface on a device display, at least one of a representation of the recommendation data or a representation of one or more of the new second type digital objects.

18. A system comprising:
   one or more processors; and
   one or more computer-readable non-transitory storage media coupled to one or more of the processors and storing instructions operable when executed by one or more of the processors to cause the system to perform operations comprising:
   digitally storing a plurality of digital objects comprising first type digital objects and second type digital objects, each digital object comprising an electronic digital representation of natural language text;
   generating a corpus of digital documents, each digital document of the corpus comprising:
      the electronic digital representation of natural language text of each particular second type digital object of the plurality of digital objects; and
      the electronic digital representation of natural language text of each first type digital object associated with that particular second type digital object;
   vectorizing each digital document of the corpus to generate a first set of vectors;
   embedding the electronic digital representation of natural language text of each first type digital object not associated with one of the second type digital objects in a vector space of the first set of vectors, thereby generating a second set of vectors, each vector of the second set of vectors being associated with each first type digital object comprising the electronic digital representation of natural language text from which it was embedded;
   determining, for each vector of the second set of vectors, a corresponding set of nearest neighbor vectors selected from the first set of vectors;
   generating recommendation data indicating one or more potential new associations between first type digital objects and second type digital objects by:
      generating, for each vector of the second set of vectors, a similarity metric between that vector and each vector of the corresponding set of nearest neighbor vectors; and
      comparing the generated similarity metrics to a threshold similarity metric stored in computer memory;
   generating a third set of vectors from the specific vectors of the second set of vectors that did not generate any similarity metrics above the threshold similarity metric by embedding each first type digital object associated with those specific vectors in a new vector space;
   clustering a plurality of vectors of the third set of vectors, thereby generating one or more clusters of vectors;
   generating, for each cluster of vectors, a corresponding new second type digital object; and
   associating, for each cluster of vectors, for each particular first type digital object from which a vector in that cluster of vectors was generated, that particular first type digital object with the corresponding new second type digital object; and
   displaying, in a graphical user interface on a device display, at least one of a representation of the recommendation data or a representation of one or more of the new second type digital objects.

* * * * *